(12) United States Patent
Nakaya (10) Patent No.: US 8,115,802 B2
(45) Date of Patent: Feb. 14, 2012

(54) IMAGE PROCESSING SYSTEM, DISPLAY APPARATUS AND IMAGE PROCESSING METHOD

(75) Inventor: Eiji Nakaya, Tatsuno-machi (JP)

(73) Assignee: Seiko Epson Corporation, Tokyo (JP)

( * ) Notice: Subject to any disclaimer, the term of this patent is extended or adjusted under 35 U.S.C. 154(b) by 1372 days.

(21) Appl. No.: 11/685,529

(22) Filed: Mar. 13, 2007

(65) Prior Publication Data

US 2007/0216766 A1   Sep. 20, 2007

(30) Foreign Application Priority Data

Mar. 14, 2006   (JP) ................................ 2006-069522

(51) Int. Cl.
*H04N 13/00* (2006.01)
(52) U.S. Cl. .......... 348/42; 345/419; 345/501; 345/613; 349/15
(58) Field of Classification Search .................... 348/42; 345/419, 501, 613; 349/15
See application file for complete search history.

(56) References Cited

U.S. PATENT DOCUMENTS

| 5,959,664 | A | * | 9/1999 | Woodgate ........................ 348/59 |
| 6,005,607 | A | * | 12/1999 | Uomori et al. .................. 348/42 |
| 6,061,083 | A | | 5/2000 | Aritake et al. |
| 6,175,379 | B1 | * | 1/2001 | Uomori et al. .................. 348/47 |
| 6,268,880 | B1 | * | 7/2001 | Uomori et al. .................. 348/47 |
| 6,353,457 | B2 | * | 3/2002 | Uomori et al. .................. 348/47 |
| 6,417,880 | B1 | * | 7/2002 | Uomori et al. .................. 348/42 |
| 7,106,274 | B2 | | 9/2006 | Nishihara et al. |
| 7,525,541 | B2 | * | 4/2009 | Chun et al. ..................... 345/419 |
| 7,609,330 | B2 | * | 10/2009 | Kim ................................ 349/15 |
| 7,894,005 | B2 | * | 2/2011 | Kim ................................ 349/15 |
| 2006/0238545 | A1 | * | 10/2006 | Bakin et al. .................... 345/613 |
| 2008/0007559 | A1 | * | 1/2008 | Kalaiah et al. ................. 345/501 |

FOREIGN PATENT DOCUMENTS

| JP | A-07-322305 | 12/1995 |
| JP | A-09-289655 | 11/1997 |
| JP | A-2003-337303 | 11/2003 |
| JP | A-2004-104368 | 4/2004 |
| JP | A-2004-322731 | 11/2004 |
| JP | A 2004-334550 | 11/2004 |
| JP | A-2005-352267 | 12/2005 |

* cited by examiner

*Primary Examiner* — Michael Won
(74) *Attorney, Agent, or Firm* — Oliff & Berridge, PLC (57) ABSTRACT

An image processing system for stereoscopic view using a parallax barrier method includes an image information generating unit that generates image information of a lower resolution than an actual resolution for each of a first to an nth viewpoints. A receiving unit reconfigures the image information, which is stored in a buffer. A combining/transmitting unit generates an image signal for displaying as one stereoscopic image by combining the image information transferred to a unique area of a screen buffer and transmits the image signal to a liquid crystal panel. A transmission speed of the generated signal transmitting unit is set to be at least n times faster than that of the combining/transmitting unit.

10 Claims, 9 Drawing Sheets

| Frame | Viewpoint | Color of leading line | Processing details |
|---|---|---|---|
| 01 | Invalid | Black | Detect next frame drawing start trigger, set up 3D model |
| 02 | Invalid | Black | Set up 3D model |
| 03 | Invalid | Black | Set up 3D model |
| 04 | Invalid | Black | Start rendering for first viewpoint |
| 05 | Invalid | Black | Finish rendering, append blue line, swap buffers |
| 06 | 1 | Blue | Start rendering for second viewpoint |
| 07 | 1 | Blue | Finish rendering, append red line, swap buffers |
| 08 | 2 | Red | Start rendering for third viewpoint |
| 09 | 2 | Red | Finish rendering, append purple line, swap buffers |
| 10 | 3 | Purple | Start rendering for fourth viewpoint |
| 11 | 3 | Purple | Finish rendering, append green line, swap buffers |
| 12 | 4 | Green | Append black line, swap buffers |

IMAGE PROCESSING SYSTEM, DISPLAY APPARATUS AND IMAGE PROCESSING METHOD

BACKGROUND

1. Technical Field

The present invention relates to an image processing system, a display apparatus and an image processing method for stereoscopic view using a parallax barrier method.

2. Related Art

In JP-A-2004-334550, for example, there is described an image processing method for stereoscopic view using a parallax barrier method provided with a parallax barrier corresponding to each of subpixels.

In a hitherto known technique such as that of JP-A-2004-334550, it has been necessary to carry out a rendering or the like of image data for a total number of pixels for every viewpoint.

However, in the case of the image processing system for stereoscopic view using the parallax barrier method, what can actually be seen to be three-dimensional is an image of a number of effective pixels smaller than the total number of pixels. For example, in a case of stereoscopic view using a four-viewpoint stepwise parallax barrier method, if the size of the total pixels is 800 pixels in the horizontal direction by 600 pixels in the vertical direction, the size of the effective pixels is 600 pixels in horizontal direction by 200 pixels in vertical direction.

That is, in the hitherto known technique, as the rendering or the like of the image data for the total number of pixels is carried out for every view point, there has been a waste in an image processing.

Also, in order to carry out the rendering or the like at a high speed, it is preferable to use a high performance image processing processor but, in a display apparatus embedded on a gaming machine or the like, in order to control costs, it is necessary to adopt a low performance image processing processor for image processing.

SUMMARY

An advantage of some aspects of the invention is to provide an image processing system, a display apparatus and an image processing method capable of performing image processing more efficiently in image processing for stereoscopic view using the parallax barrier method.

An image processing system according to an aspect of the invention is an image processing system for stereoscopic view using a parallax barrier method, including: an image generator; and an image combiner connected to the image generator via a signal transmission channel. The image generator includes: an image information generating unit which generates image information configured of a number of pixels of a lower resolution than an actual resolution for each of a first to an nth (n is an integer of 2 or greater) viewpoint; and a generated signal transmitting unit which transmits a generated image signal based on the image information to the signal transmission channel. The image combiner includes: a receiving unit which receives the generated image signal via the signal transmission channel, and reconfigures the image information based on the relevant generated image signal; a screen buffer which is divided into unique areas corresponding to the first to nth viewpoints, and stores the reconfigured information corresponding to each viewpoint; a transfer unit which transfers the image information to each unique area of the screen buffer; and a combining/transmitting unit which generates an image signal for displaying images separated into the individual viewpoint by parallax barriers as one stereoscopic image by combining the image information transferred to each unique area of the screen buffer, and transmits the image signal to a liquid crystal panel. A transmission speed of the generated signal transmitting unit is set to be at least n times faster than a transmission speed of the combining/transmitting unit.

Also, an image processing method according to another aspect of the invention is an image processing method of a display apparatus including: a liquid crystal panel for stereoscopic view using a parallax barrier method; an image generator; and an image combiner connected to the image generator via a signal transmission channel. The image generator: generates image information configured of a number of pixels of a lower resolution than an actual resolution for each of a first to an nth (n is an integer of 2 or greater) viewpoints; and transmits a generated image signal based on the image information to the signal transmission channel. The image combiner: receives the generated image signal via the signal transmission channel, and reconfigures the image information based on the relevant generated image signal; transfers the reconfigured image information to each unique area of a screen buffer which is divided into unique areas corresponding to the first to nth viewpoint; and generates an image signal for displaying images separated into the individual viewpoints by parallax barriers as one stereoscopic image by combining the image information transferred to each unique area of the screen buffer, transmits the image signal to a liquid crystal panel. A speed of the transmission of the generated image signal by the image generator is set to be at least n times faster than a speed of the transmission of the image signal by the image combiner.

According to the aspects of the invention, in the image processing system and the like, compared with the case of carrying out the rendering or the like for the actual number of pixels as related art, processing load such as the rendering could be reduced by using the rendering or the like to generate the image information configured of the number of pixels of a lower resolution than the actual resolution on a viewpoint by viewpoint basis. By this means, in the image processing system and the like, it is possible to more efficiently execute the image processing for the stereoscopic view using the parallax barrier method.

Also, the image processing system, originally having an ability to transmit the image information for the actual resolution, has enough ability to generate the image information for the low resolution and transmit it. Further, by setting the dot clock of the image generator to a significantly higher speed than normal to increase the generated image signal transmission speed, the image processing system can increase opportunity to transmit the image information. For example, a series of processes (image generating/combining/transmitting) is executed once within 1/60-second in the related art, however, the image processing system can execute the series of processes two or more times within 1/60-second. Therefore, the display processing system is applicable for processing of the stereoscopic view, because multiple individual images for each viewpoint can sequentially be generated/combined/transmitted within an actual time (in real time).

Also, it is acceptable that the image information generating unit appends viewpoint information to the rendered image information. Here, the viewpoint information indicates which viewpoint the relevant image information is for. Further, based on the viewpoint information, the transfer unit can transfer image information not including the viewpoint information to a unique area corresponding to a viewpoint indicated by the relevant viewpoint information if the viewpoint information is appended.

Accordingly, in the image processing system and the like, it is possible, based on the viewpoint information, to transfer the image information to a unique area corresponding to the viewpoint.

Also, it is acceptable that, if there is no need to update generated image information generated immediately before, the image information generating unit appends invalidity information to the generated image information generated immediately before without further rendering. Here, the invalidity information indicates that the generated image information is invalid. Further, it is acceptable that, if the invalidity information is appended, the transfer unit does not transfer the image information.

Accordingly, in the image processing system and the like, there is no need to carry out the transfer of the image information even if the generated image signal is input into the image combiner. Therefore, it is possible to reduce the image processing load.

Also, it is acceptable that, in the case that display image using parallax barrier method is observed as a stereoscopic view in which different images are at least simultaneously observed with left and right eyes, the number of pixels of the lower resolution is derived by dividing a total number of pixels configuring a whole of the display image by a number of viewpoints n.

Also, it is acceptable that the image information generating unit generates the image information by means of the rendering.

Accordingly, in the image processing system and the like, by carrying out the rendering at the lower resolution, it is possible to reduce the processing load, compared with the case of carrying out the rendering at the actual resolution.

Also, it is acceptable that the combining/transmitting unit, based on a mask pattern correlated with each viewpoint, by referring to each unique area of the screen buffer, combines sub-pixel components as a stereoscopic image is observed, and transmits the image signal to the liquid crystal panel.

Accordingly, in the image processing system and the like, it is possible, based on the mask pattern, to appropriately determine which pixel data for which viewpoint is to be transmitted to the liquid crystal panel.

Also, a display apparatus according to still another aspect of the invention is a display apparatus including the image processing system, which includes the liquid crystal panel in which parallax barriers are provided in units of sub-pixels, the mask patterns being set based on a position of the parallax barriers.

According to the aspect of the invention, in the display apparatus, by using the mask patterns set based on the position of the parallax barriers, it is possible to execute the image processing in units of sub-pixels.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereafter, a case in which the invention is applied to a display apparatus will be described as an example while referring to the drawings. An embodiment to be described hereafter in no way limits the contents of the invention described in the claims. Also, it is not necessary that all of the configurations shown in the following embodiment are essential as solving means of the invention described in the claims.

Figure 1:
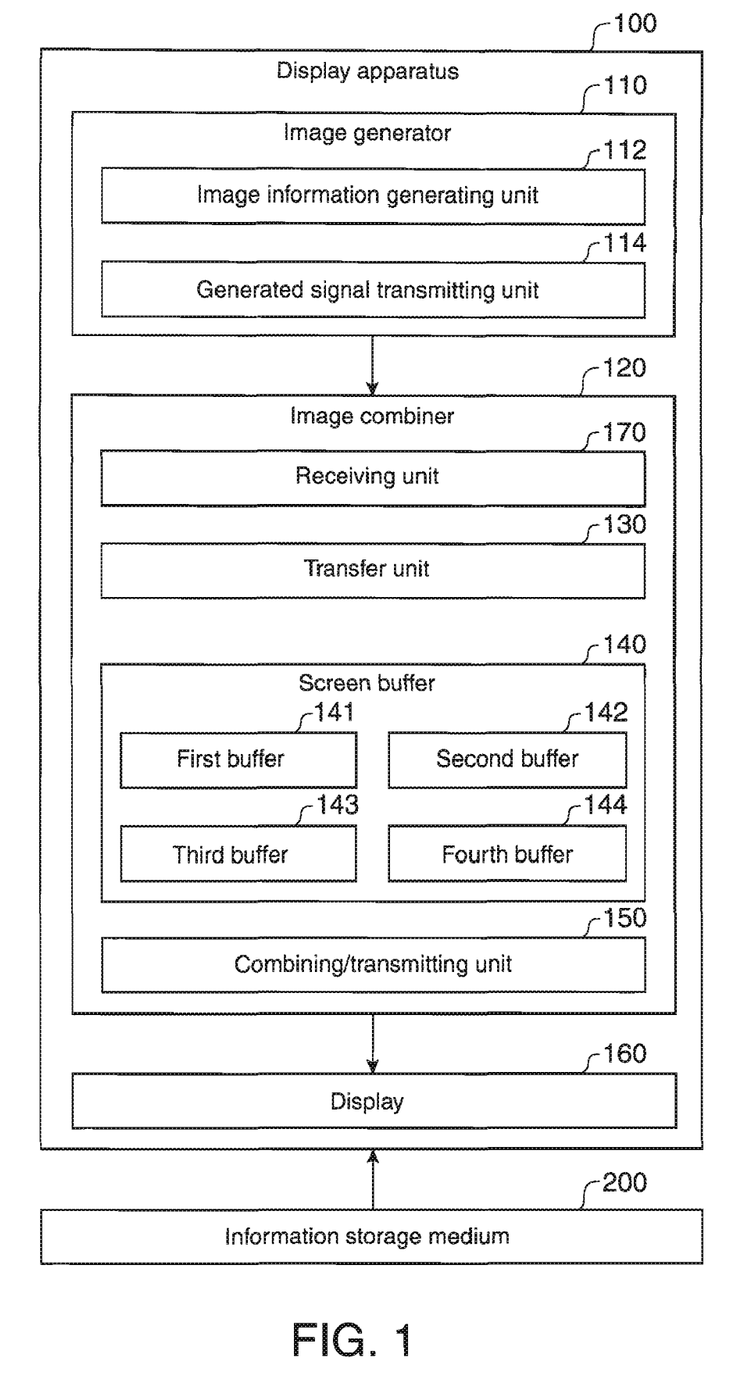
FIG. 1 is a functional block diagram of a display apparatus according to an embodiment.

FIG. 1 is a functional block diagram of a display apparatus 100 according to the embodiment.

The display apparatus 100 includes an image generator 110, an image combiner 120 connected to the image generator 110 via a signal transmission channel, and a display 160 which displays an image combined by the image combiner 120.

Also, the image generator 110 includes an image information generating unit 112 and a generated signal transmitting unit 114. The image information generating unit 112 generates image information configured of a number of pixels of a low resolution lower than an actual resolution for each of the first to fourth viewpoints. The generated signal transmitting unit 114 transmits a generated image signal based on the image information to the signal transmission channel at a higher speed than normal.

Also, the image combiner 120 includes a receiving unit 170, a screen buffer 140, a transfer unit 130 and a combining/transmitting unit 150. The receiving unit 170 receives the generated image signal via the signal transmission channel, and reconfigures the image information based on the relevant generated image signal. A screen buffer 140 stores the image information reconfigured by the receiving unit 170. In the screen buffer 140, the reconfigured information is stored corresponding to each of the first to fourth viewpoints. A transfer unit 130 transfers the image information to a unique area of the screen buffer 140 which corresponds to each viewpoint. A combining/transmitting unit 150 generates an image signal for displaying images separated into the each viewpoint by parallax barriers as one stereoscopic image by combines the image information transferred to each unique area of the screen buffer 140, and transmits the image signal to the display 160.

Also, the screen buffer 140 includes a first buffer 141 to a fourth buffer 144. The first buffer 141 to the fourth buffer 144 are unique areas corresponding to each viewpoint, and store the image information in such a way that it is correlated with the first to fourth viewpoints.

The image generator 110 and the image combiner 120 function also as an image processing system for stereoscopic view using a parallax barrier method.

Also, the display device 100 can implement the functions of these components by retrieving a program from information storage medium 200.

As the information storage medium 200, it is possible to apply a storage medium using laser, magnetism or the like such as, for example, a CD-ROM, a DVD-ROM, an IC card, an ROM, an RAM, a memory card or an HDD. Also, a system of retrieving the program from the information storage medium 200 may be either of a connect type or a nonconnect type. Also, the display device 100 can implement the functions of these components by downloading the program via a network.

Also, as hardware for implementing each of these components, the following can be adopted.

Figure 2:
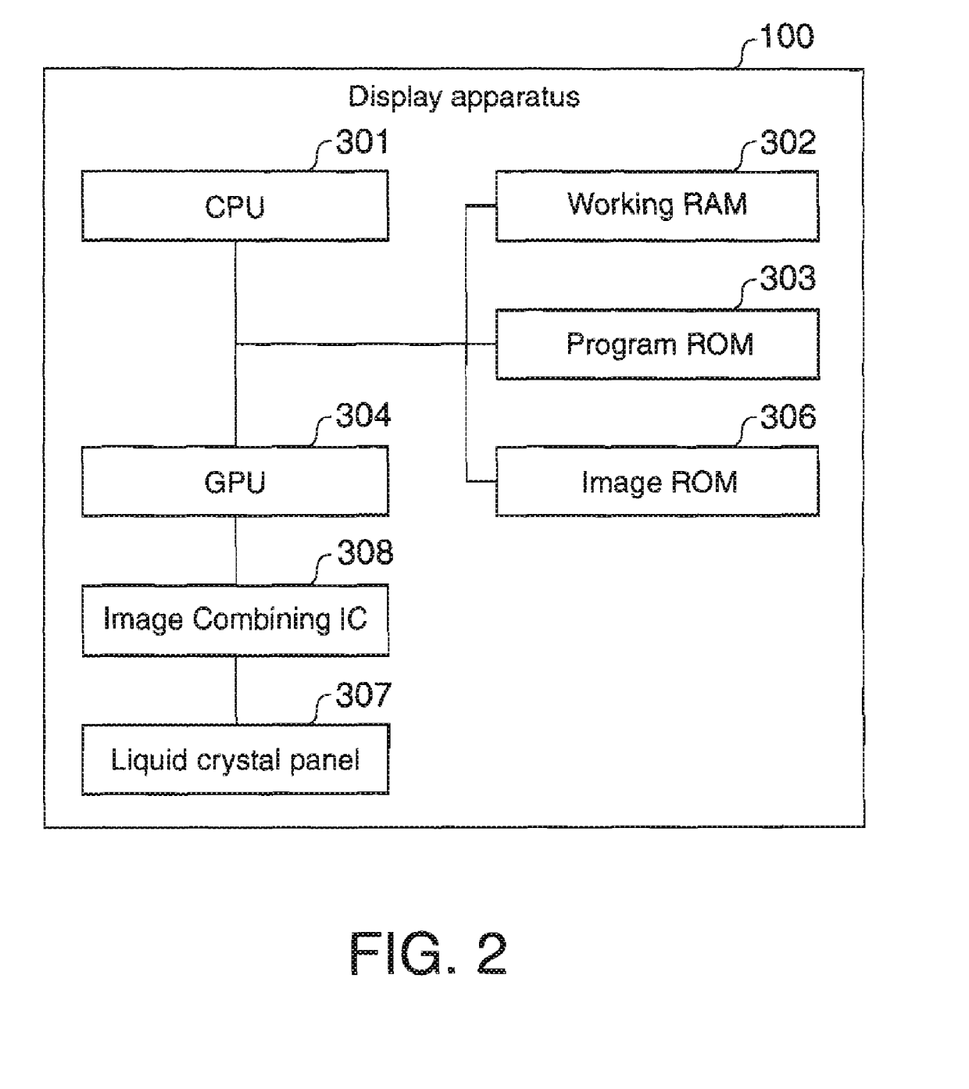
FIG. 2 is a hardware block diagram of the display apparatus according to the embodiment.

FIG. 2 is a hardware block diagram of the display apparatus according to the embodiment.

For example, the display apparatus 100 includes a CPU 301, a working RAM 302 for the CPU, a program ROM 303, a GPU 304 which is an image processing processor, an image ROM 306, a liquid crystal panel 307 and an image combining IC 308.

For example, the function of the image generator 110 can be implemented by the CPU 301, the working RAM 302, the program ROM 303 and the GPU 304. The function of the image combiner 120 can be implemented by the image combining IC 308. Further, the function of the display 160 can be implemented by the liquid crystal panel 307. As the CPU 301, the working RAM 302, the program ROM 303 and the GPU 304, generalized hardware can be adopted.

Also, a transfer speed between the GPU 304 and the image combining IC 308 according to the embodiment is set to be significantly faster than a transfer speed between the image combining IC 308 and the liquid crystal panel 307. More specifically, for example, a clock speed of a dot clock serving as a reference for an operation speed of the generated signal transmitting unit 114 is set to be at least 4 times (an amount equivalent to the four viewpoints) faster than a clock speed of a dot clock serving as a reference for an operation speed of the combining/transmitting unit 150.

Also, the liquid crystal panel 307 is a liquid crystal panel provided with parallax barriers for stereoscopic view. As a number of viewpoints, any integers (e.g., two, four, or seven) equal to or larger than two can be adopted.

The parallax barriers are provided corresponding to each subpixels. Here, the stereoscopic view with two viewpoints and four viewpoints will be explained.

Figure 11:
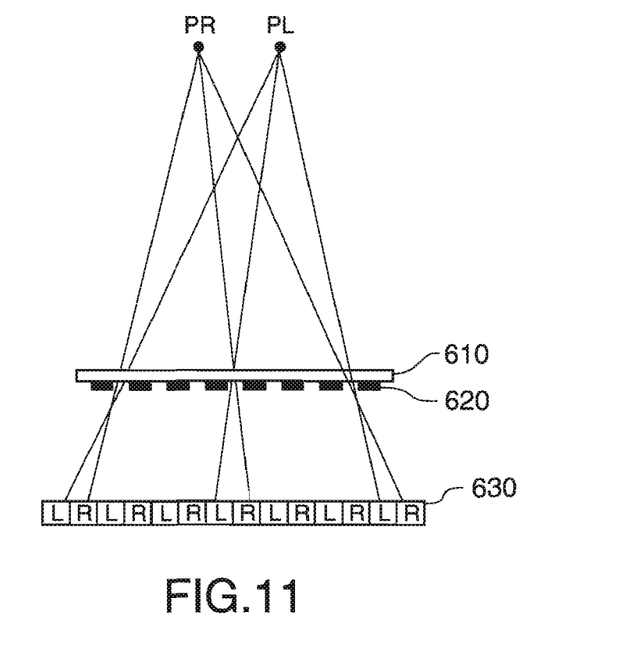
FIG. 11 is a schematic diagram of a stereoscopic view using a two-viewpoint parallax barrier method.
Figure 12:
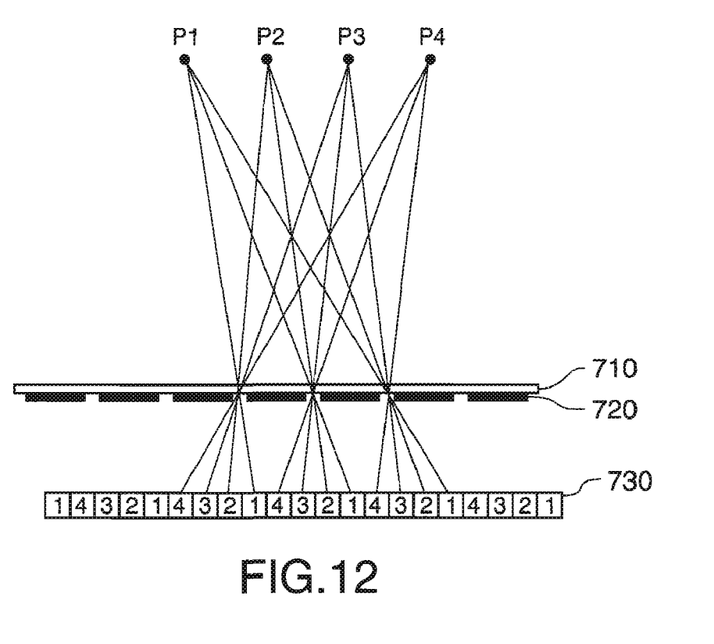
FIG. 12 is a schematic diagram of a stereoscopic view using a four-viewpoint parallax barrier method.

FIG. 11 is a schematic diagram of a stereoscopic view using a two-viewpoint parallax barrier method. Also, FIG. 12 is a schematic diagram of a stereoscopic view using a four-viewpoint parallax barrier method.

In the case of the two viewpoints, opaque parallax barriers 620 are provided in front of an LCD 630, and an observer can observe stereoscopic view by observing right-eye pixels R from a right-eye viewpoint 1 (PR) via a lens filter 610, and by observing left-eye pixels L from a left-eye viewpoint 2 (PL). The parallax barriers 620 can also be provided behind the LCD 620.

Also, in the case of the four viewpoints, as with the case of the two viewpoints, opaque parallax barriers 720 are provided in front of an LCD 730, and the observer can observe stereoscopic view by observing any of a pixel 1 to a pixel 4 from two optional adjacent ones of a viewpoint 1 (P1) a viewpoint 2 (P2), a viewpoint 3 (P3) or a viewpoint 4 (P4) via a lens filter 710. The parallax barriers 720 can be provided behind the LCD 720.

Hereafter, a 3D image process in the case of the four viewpoints will be described as an example.

Firstly, an image processing procedure of related art from setup of a 3D model to display of the image will be explained.

Figure 3:
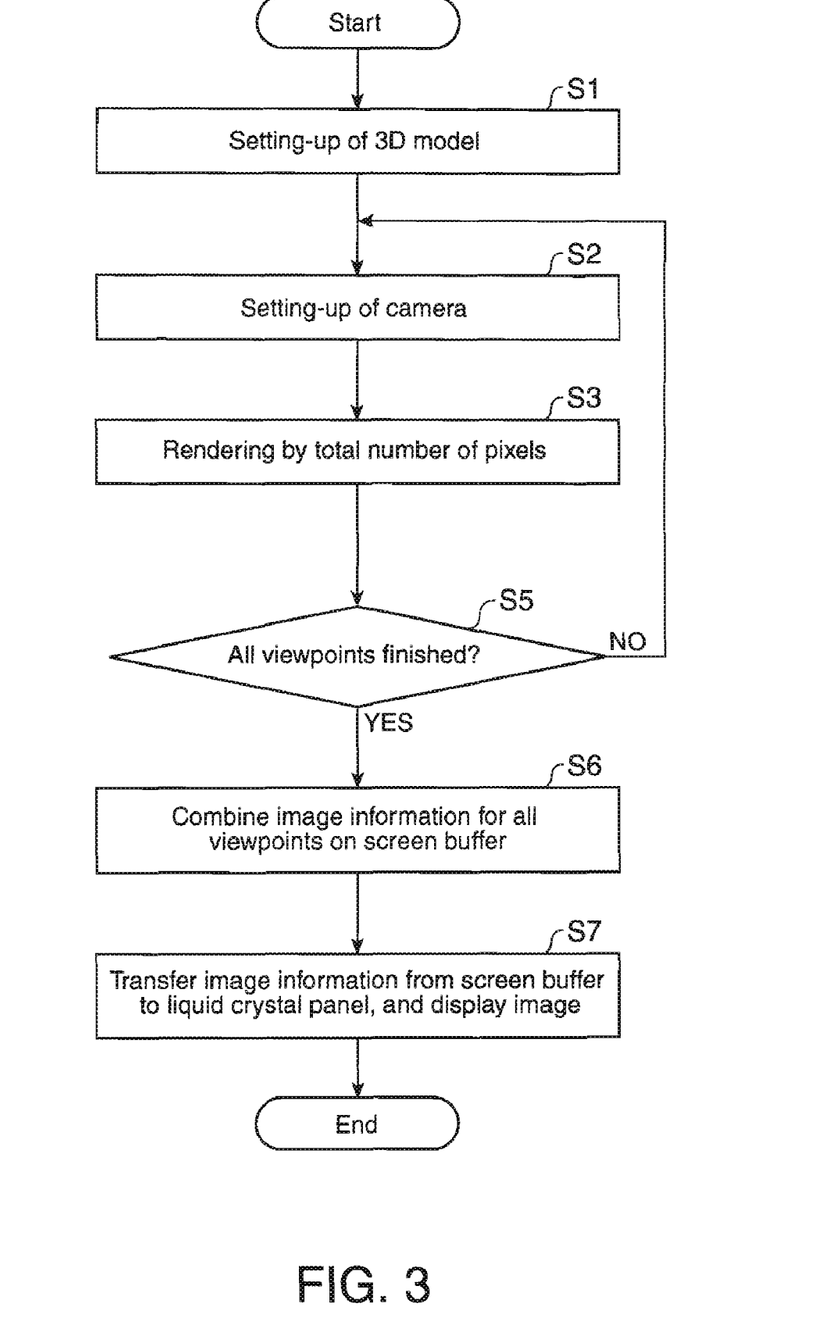
FIG. 3 is a flowchart showing a hitherto known image processing procedure.

FIG. 3 is a flowchart showing the hitherto known image processing procedure.

A hitherto known display apparatus carries out the setting-up of the 3D model (a calculation of a vertex, a transfer of vertex data and texture data) at the time of an updating the image (step S1).

Then, the display apparatus carries out a setting-up of a camera (step S2), and carries out a rendering for a total number of pixels (for example, 480000 pixels in a liquid crystal panel which has 800×600 pixels as an actual resolution) (step S3).

Furthermore, the display apparatus executes the processes of steps S2 and S3 for each viewpoint until all of the processes for each viewpoint finish (step S5). In the case of the four viewpoints, renderings for 1920000 pixels are carried out in the heretofore described example.

Then, after rendering for all the viewpoints, the display apparatus combines those rendered image information for each viewpoint on a screen buffer (step S6), transfers the image information to the liquid crystal panel, and displays the image (step S7).

On the other hand, the display apparatus 100 of the embodiment carries out a rendering for a number of effective pixels, thereby shortening a time required for the rendering, compared with the hitherto known case.

Also, the display apparatus 100 of the embodiment transmits an image signal generated by the generalized GPU 304 to the signal transmission channel at a high frame rate. The display apparatus 100 further combines the image information for the four viewpoints by the image combining IC 308, and transmits the combined image information to the liquid crystal panel 307.

A description will be given, firstly, of a process in the image generator 110 and, next, of a process in the image combiner 120.

Figure 4A:
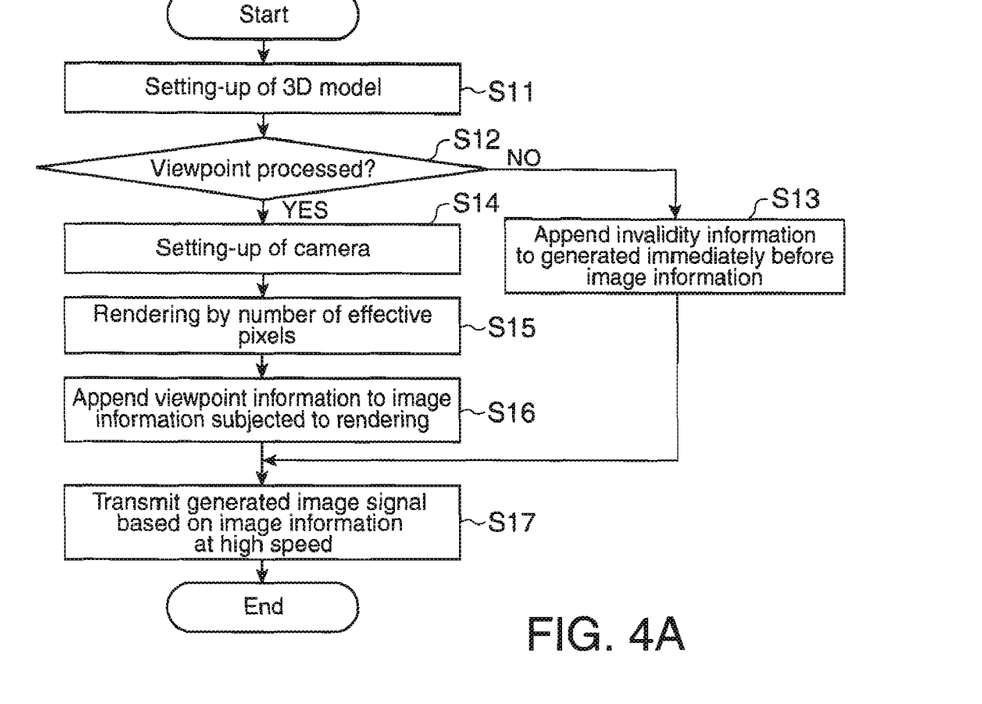
FIG. 4A is a flowchart showing a processing procedure of an image generator.

FIG. 4A is a flowchart showing a processing procedure of the image generator 110.

The image information generating unit 112 (the CPU 301) determines whether or not a condition is such that a process for each viewpoint is to be carried out after the setting-up of the 3D model (step S11) (step S12) and, if the condition is not such that the process for each viewpoint is to be carried out, appends to immediately previously generated (already transmitted) image information the invalidity information indicating that the relevant image information is invalid (step S13).

Contrarily, if the condition is such that the process for each viewpoint is to be carried out, the image information generating unit 112 carries out the setting-up of the camera (step S14), and carries out the rendering for the number of effective pixels (step S15). In the case that display image using parallax barrier method is observed as a stereoscopic view in which different images are simultaneously observed at least with left and right eyes, the number of effective pixels is derived by dividing the total number of pixels configuring a whole of the display image by a number of viewpoints n. For example, in a known stereoscopic liquid crystal panel for four viewpoints which consists of 800×600 pixels, the number of effective pixels or an effective resolution is 600×200=120000 pixels.

That is, in the event of the four viewpoints, a rendering for 600×200×4=480000 pixels is carried out in order to display the one stereoscopic image.

Figure 5:
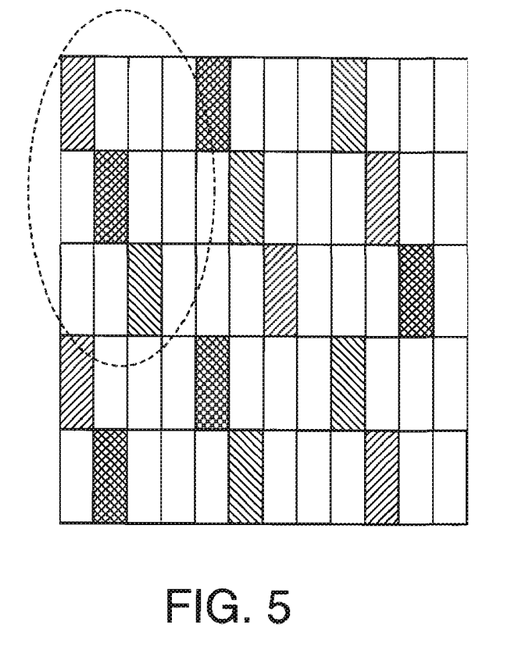
FIG. 5 is a schematic diagram showing a pixel group for a viewpoint 1.
Figure 6:
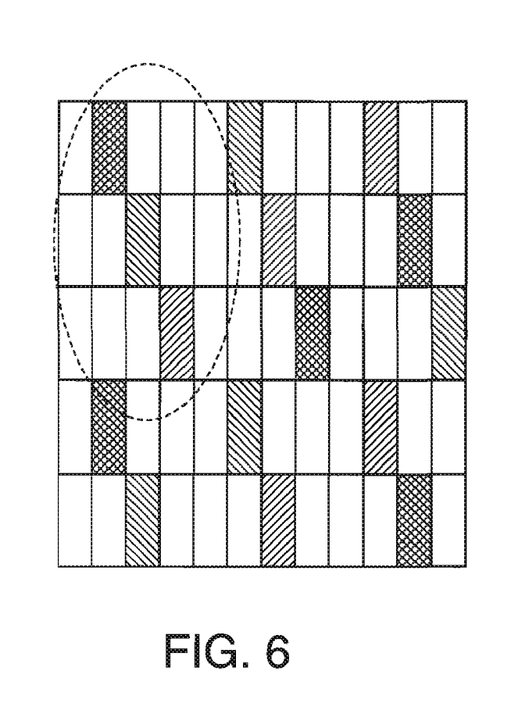
FIG. 6 is a schematic diagram showing a pixel group for a viewpoint 2.
Figure 7:
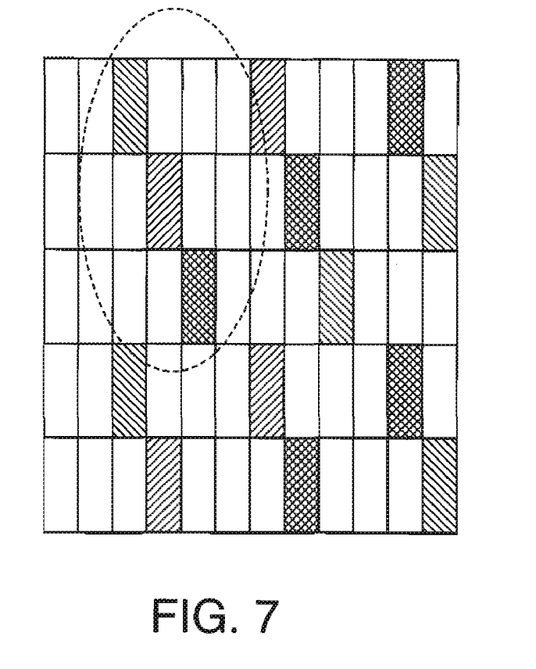
FIG. 7 is a schematic diagram showing a pixel group for a viewpoint 3.
Figure 8:
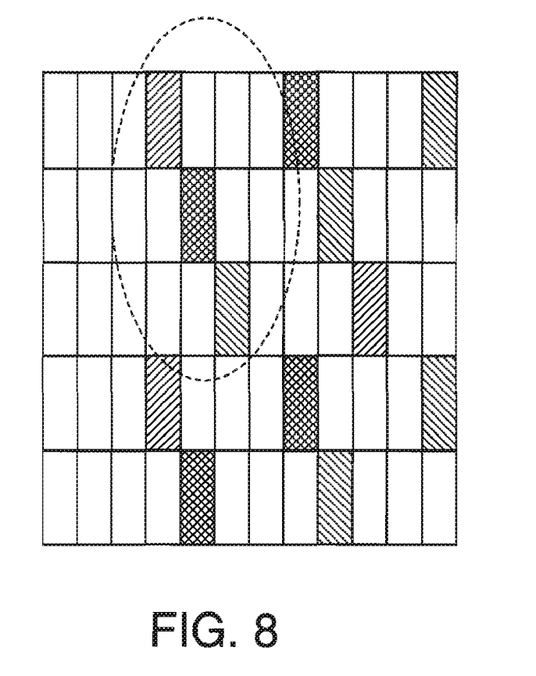
FIG. 8 is a schematic diagram showing a pixel group for a viewpoint 4.

FIG. 5 is a schematic diagram showing a pixel group for the viewpoint 1. Also, FIG. 6 is a schematic diagram showing a pixel group for the viewpoint 2. Also, FIG. 7 is a schematic diagram showing a pixel group for the viewpoint 3. Also, FIG. 8 is a schematic diagram showing a pixel group for the viewpoint 4. The pixel groups shown in FIGS. 5 to 8 show only a portion of the image.

A stepwise parallax barrier method is adopted in the embodiment. For example, as shown in FIG. 5, an R pixel (a hatched portion with right end up diagonal lines), a G pixel (a crosshatched portion) and a B pixel (a hatched portion with left end up diagonal lines) are disposed aslant, and the pixels for the viewpoint 1 are represented by the three sub-pixels. Also, a portion surrounded by a broken line designates the pixels for the viewpoint 1 at coordinates (0, 0) of the effective resolution.

Also, as seen from a comparison of FIGS. 5 to 8, pixels adjacent to the right of the pixels for the viewpoint 1 are used as the pixels for the viewpoint 2, pixels adjacent to the right of the pixels for the viewpoint 2 are used as the pixels for the viewpoint 3, and pixels adjacent to the right of the pixels for the viewpoint 3 are used as the pixels for the viewpoint 4.

Also, in a case of a 4-viewpoint using stepwise parallax barrier method, the effective resolution (the number of effective pixels) is three quarters in a horizontal resolution, and is one-third in a vertical resolution. For this reason, in the event that the total number of pixels of the liquid crystal panel 307 is 800×600 pixels, the number of effective pixels is 600×200 pixels.

Also, the image information generating unit 112 appends the viewpoint information to the image information subjected to the rendering (step S16). The viewpoint information is information indicating which viewpoint the image information is for.

Also, in the embodiment, the invalidity information and the viewpoint information are appended to a leading one line of the image information. That is, if the number of effective pixels is 600×200, image information appended the invalidity information or the viewpoint information equals to information for 600×201 pixels.

The generated signal transmitting unit 114 converts the image information appended the invalidity information or the viewpoint information into a generated image signal for use in the transmission, and transmits the generated image signal via the signal transmission channel at a higher transmitting speed than a common speed (step S17). The signal transmission channel is a transmission channel between the GPU 304 and the image combining IC 308. Also, the dot clock of the GPU 304 is set to be sufficiently fast within its capability. For example, by setting the dot clock of the GPU 304 to be nearby 100 MHz (commonly, 25 MHz is adopted), it becomes possible for the generated signal transmitting unit 114 to transmit the generated image signal at 360 frames per second.

A more detailed description will be given of the above process of the image generator 110.

Figure 9:
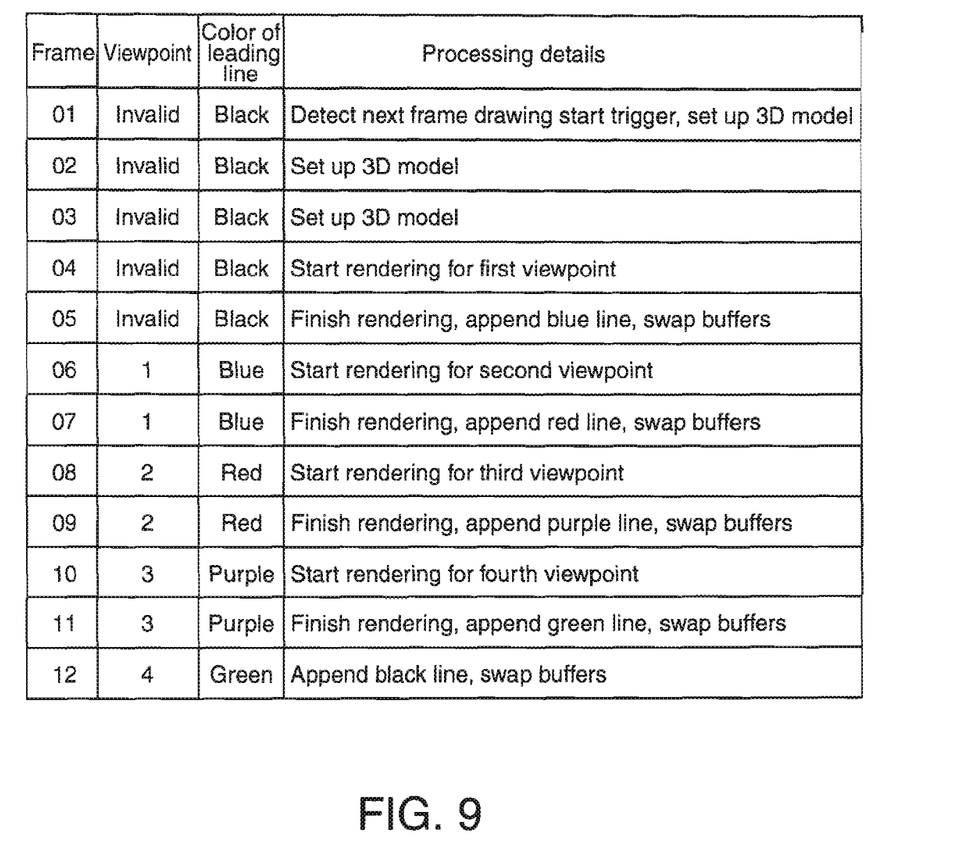
FIG. 9 shows an image processing detail for each frame of the image generator according to the embodiment.

FIG. 9 shows an image processing detail for each frame (in a period, for example, 1/360 second) of the image generator 110 according to the embodiment.

For example, in frames 01, 02 and 03, the image information generating unit 112 awaits a next frame drawing start trigger which occurs every 1/30 second, and carries out the setting-up of the 3D model. Also, in the frames 01, 02 and 03, the image information generating unit 112 draws a black line (the invalidity information) onto a leading one line of a drawing buffer in the GPU 304. An output buffer and the drawing buffer in the GPU 304 are switched by swapping buffer.

Then, in a frame 04, the image information generating unit 112 starts rendering for the first viewpoint. Also, in a frame 05, the image information generating unit 112 finishes rendering for the first viewpoint, and appends a blue line (the viewpoint information) to the leading one line. At this time, the image information for the viewpoint 1 with the leading one line turned blue is written in the drawing buffer. Also, the image information generating unit 112 switches the output buffer and the drawing buffer by swapping buffer.

Then, in a frame 06, the image information generating unit 112 starts rendering for the second viewpoint. Also, in a frame 07, the image information generating unit 112 finishes rendering for the second viewpoint, and appends a red line (the viewpoint information) to the leading one line. At this time, the image information for the viewpoint 2 with the leading one line turned red is written in the drawing buffer. Also, the image information generating unit 112 switches the output buffer and the drawing buffer by swapping buffer.

Then, in a frame 08, the image information generating unit 112 starts rendering for the third viewpoint. Also, in a frame 09, the image information generating unit 112 finishes rendering for the third viewpoint, and appends a purple line (the viewpoint information) to the leading one line. At this time, the image information for the viewpoint 3 with the leading one line turned purple is written in the drawing buffer. Also, the image information generating unit 112 switches the output buffer and the drawing buffer by swapping buffer.

Then, in a frame 10, the image information generating unit 112 starts rendering for the fourth viewpoint. Also, in a frame 11, the image information generating unit 112 finishes rendering for the fourth viewpoint, and appends a green line (the viewpoint information to the leading one line. At this time, the image information for the viewpoint 4 with the leading one line turned green is written in the drawing buffer. Also, the image information generating unit 112 switches the output buffer and the drawing buffer by swapping buffer.

Then, in a frame 12, the image information generating unit 112 writes a black line (the invalidity information) into the leading one line of the drawing buffer, and carries out swapping buffer.

The processes in the frames 01 to 12 are repeatedly executed every 1/30 second while the image is being displayed. Also, the generated signal transmitting unit 114 transmits the image information in the output buffer as the generated image signal on a frame by frame basis.

Figure 4B:
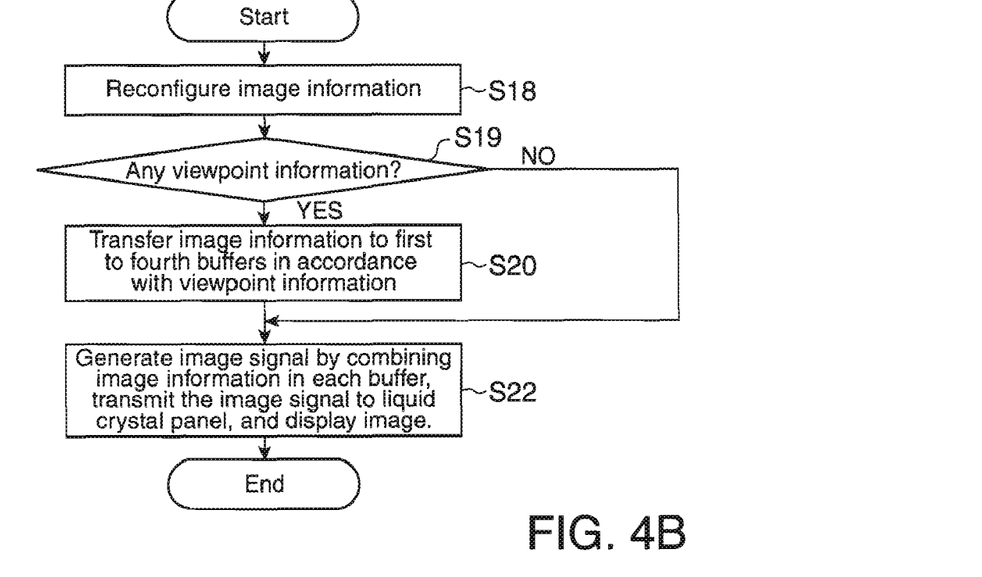
FIG. 4B is a flowchart showing a processing procedure of an image combiner.

Next, a description will be given of an image combining process. FIG. 4B is a flowchart showing a processing procedure of the image generator 120.

The image combiner 120 (the image combining IC 308) generates one image for stereoscopic view based on the generated image signal transmitted from the image generator 110 (the GPU 304).

Firstly, the receiving unit 170 receives the generated image signal from the generated signal transmitting unit 114, and reconfigures the original image information from the generated image signal. That is, the generated signal transmitting unit 114 converts a transmission signal into image processing information (step S18).

Then, the transfer unit 130, by referring to a leading one line of the reconfigured image information, determines whether or not there is viewpoint information (step S19).

In accordance with the viewpoint information (a color of the leading one line), the transfer unit 130 excludes information for the leading one line from the original image information if there is viewpoint information (that is, the leading one line is not black), or if the leading one line is blue, red, purple or green. Further, the transfer unit 130 transfers obtained image information to any of the first buffer 141 to the fourth buffer 144 which are the unique areas for the individual viewpoints (step S20).

For example, in the event that the leading one line of the image information is blue, the transfer unit 130 transfers to the first buffer 141 image information obtained by excluding information for the leading one line from the relevant image information. In the event that the leading one line of the image information is red, the transfer unit 130 transfers to the second buffer 142 image information obtained by excluding information for the leading one line from the relevant image information. In the event that the leading one line of the image information is purple, the transfer unit 130 transfers to the third buffer 143 image information obtained by excluding information for the leading one line from the relevant image information. In the event that the leading one line of the image information is green, the transfer unit 130 transfers to the fourth buffer 144 image information obtained by excluding information for the leading one line from the relevant image information. That is, image information of 600×200 pixels is stored in the first buffer 141 to the fourth buffer 144, respectively.

In the case of displaying the one stereoscopic image, the display apparatus 100 executes the above processes of steps S12 to S20 until the processes for all the viewpoints are finished. In practice, the image generator 110 sequentially transmits the image information (the generated image signal) while the image is being displayed, and the image combiner 120 sequentially carries out the transfer of the image information to the first buffer 141 to the fourth buffer 144 and the transmission of the image signal to the display 160.

Also, the combining/transmitting unit 150, based on a mask pattern correlated with each viewpoint, with reference to the first buffer 141 to the fourth buffer 144 (the unique areas), generates an image signal (for example, a 24-bit value containing 8 bits in each of RGB) by combining sub-pixel components (an R value, a G value and a B value) in each unique area. Further, the combining/transmitting unit 150 transmits the image signal to the liquid crystal panel in order that the stereoscopic image is observed. That is, the combining/transmitting unit 150 transmits the image signal while combining sub-pixel components (step S22). Data indicating the mask patterns (more specifically, for example, pixel masks or color masks) are generated in accordance with the parallax barriers, and stored in the image ROM 306 or the like.

Figure 10:
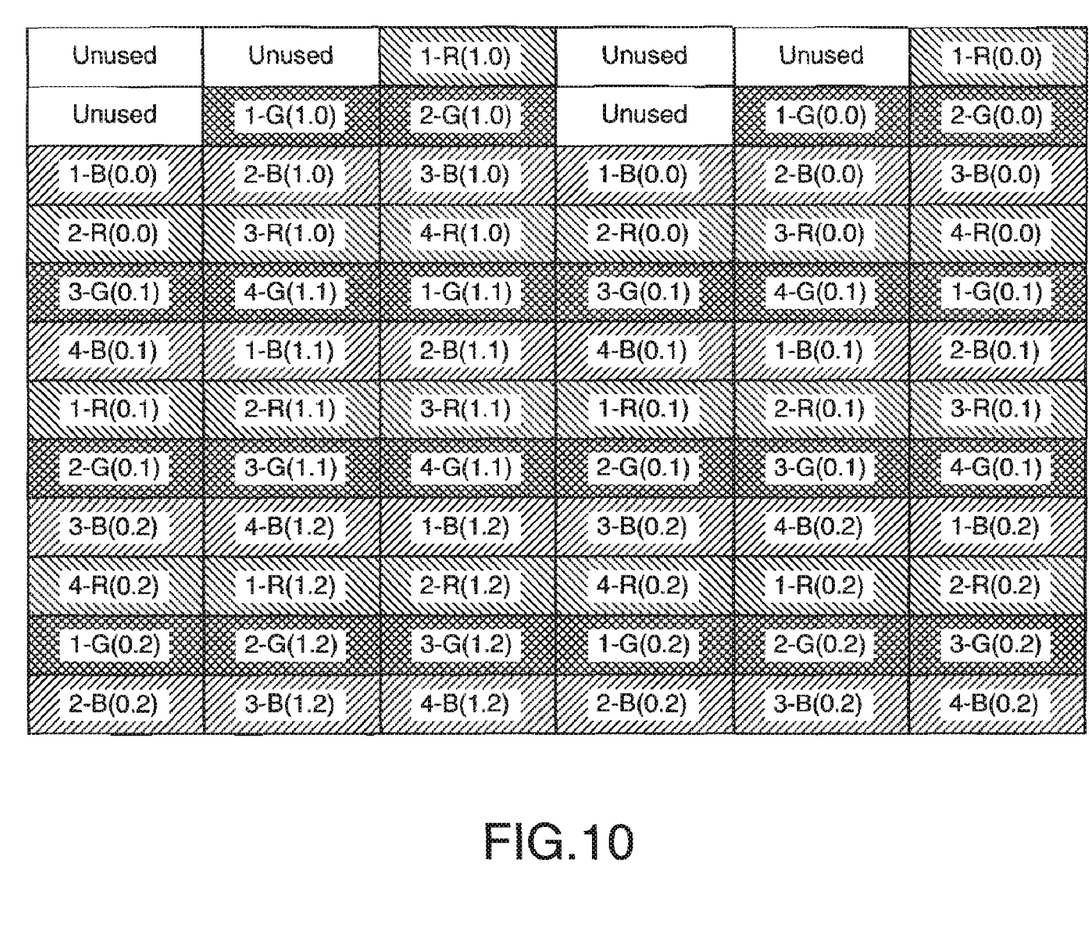
FIG. 10 is a schematic diagram showing an example of a pixel disposition in a liquid crystal panel.

FIG. 10 is a schematic diagram showing an example of a pixel disposition in the liquid crystal panel 307. The pixel disposition shown in FIG. 10 shows a portion of the image.

In FIG. 10, "1-R (0, 0)" indicates the R pixel for the viewpoint 1 at the coordinates (0, 0) of the effective resolution. For example, the sub-pixels are disposed in the order of "1-R (0, 0)", "2-G (0, 0)", "3-B (0, 0)", "4-R (0, 0)", "1-G (0, 1)" and "2-B (0, 1)" from an upper left portion of the liquid crystal panel 307.

That is, although the resolution at the time of the rendering is different from the resolution of related art, as the resolution (the pixel disposition in the liquid crystal panel 307) at the time of the display is the same as the resolution of related art, the display apparatus 100 can display the image at an appropriate resolution.

Also, in this way, as a disposition of the sub-pixels in the liquid crystal panel 307 is fixed, and a disposition of the sub-pixels in the unique areas of the screen buffer 140 is also fixed, a transmission process by the combining/transmitting unit 150 can be executed by a hardware logic. That is, it is possible to execute the transmission process faster than executing by software.

A transfer process of the transfer unit 130 and the transmission process of the combining/transmitting unit 150 are asynchronously executed. For example, the transfer unit 130 can start both executions of referring to the leading line of the image information and transferring to the buffer when the image combining IC 308 receives a vertical synchronous signal from the GPU 304, on the other hand, the combining/transmitting unit 150 can carry out the transmission of the image signal by keeping pace with the dot clock of the image combining IC 308.

Also, as described heretofore, a transmission speed of the generated signal transmitting unit 114 is set to be significantly faster than a transmission speed of the combining/transmitting unit 150. For this reason, the image generator 110 can execute the heretofore described processes in the frames 01 to 12 (12 frames) while the combining/transmitting unit 150 carries out combining the image information of the first buffer 141 to the fourth buffer 144 and transmitting the image signal to the output buffer twice (by two frames). By this means, the display apparatus 100 can appropriately display a stereoscopic animated image.

According to the embodiment, in the display apparatus 100, compared with the case of carrying out the rendering or the like for the actual number of pixels as related art, processing load such as the rendering could be reduced by using the rendering or the like to generate the image information configured of the number of pixels of a lower resolution than the actual resolution on the viewpoint by viewpoint basis. More specifically, the number of renderings is 1920000 in the related art, while it is 480000 in the technique of the embodiment, being reduced to ¼ in the heretofore described embodiment. By is means, the display apparatus 100 can more efficiently execute the image processing for stereoscopic view using the parallax barrier method.

Also, because the display apparatus 100 originally has an ability to transfer the image information for the actual resolution, the display apparatus 100 has enough ability to generate the image information for the lower resolution and to transmit it. Further, by setting the dot clock of the image generator 110 to a significantly high speed, the display apparatus 100 can increase opportunity to execute a series of processes (image generating/combining/transmitting) within a certain period. For example, the series of processes is executed once within 1/60-second in the related art, however, the display apparatus 100 can execute the series of processes two or more times within 1/60-second. Therefore, the display apparatus 100 is applicable for processing of the stereoscopic view, because multiple individual images for the viewpoints can sequentially be generated/combined/transmitted within an actual time (in real time).

Also, according to the embodiment, the display apparatus 100 can transfer the image information to an appropriate unique area by appending the viewpoint information to the image information. Therefore, the display apparatus 100 can display an appropriate image for stereoscopic view even if the GPU 304 generates the image information for each viewpoint, and the image combining IC 308 transfers the image information to the unique area for each viewpoint.

Also, according to the embodiment, by using the invalidity information, there is no need to carry out the transfer of the image information if the generated image signal is invalid. Therefore, it is possible to reduce the image processing load even if the generated image signal is input into the image combiner 120.

Furthermore, according to the embodiment, a power consumption of the display apparatus 100 is suppressed by the reduction in the image processing load, contributing also to an energy saving.

Also, by the above effects, even if a low performance GPU 304 is used, the display apparatus 100 can display a stereoscopic animated image corresponding to a 1/30-second animation in real time.

Also, according to the embodiment, the display apparatus 100 can execute the image processing in units of sub-pixels by using the mask patterns set based on a position of the parallax barriers.

An application of the invention is not limited to the heretofore described embodiment, and various modifications are possible.

For example, although the display apparatus 100 carries out the rendering or the like in the order of from the first viewpoint to the fourth viewpoint in the heretofore described embodiment, the order of processing can be changed arbitrarily. For example, it is acceptable to process in the order of the fourth viewpoint, the third viewpoint, the second viewpoint and the first viewpoint.

Also, the appended information is not limited to the line. For example, it is acceptable to use one pixel at an upper left or the like.

Also, each of the first buffer 141 to the fourth buffer 144 can include a plurality of blocks respectively, and can store the image information in each block. Also, each block in each buffer can be appended condition identification information such as a receiving block, a received information block and a transmission block. Further, the transfer unit 130 can transfer the image information to the receiving block and can change it to the received information block after the transfer. Subsequently, combining/transmitting unit 150 can transmits the image signal using the image information in the transmission block after changing the transmission block to the receiving block and changing the received information block to the transmission block.

Also, number of pixels configuring the image information generated by the image information generating unit 112 can be the number of pixels of lower resolution than the actual resolution. The number of pixels is not limited although the image information generating unit 112 generates the image information configured of the number of pixels of the effective resolution in the heretofore described embodiment.

Also, the parallax barriers of the liquid crystal panel 307 are not limited to the stepwise (slanted) ones. The parallax barriers of the liquid crystal panel 307 can be parallax barriers disposed at fixed intervals in one direction. That is, the disposition of the sub-pixels is not limited to the examples shown in FIGS. 6 to 8.

As the heretofore described display apparatus 100, specifically, for example, various apparatuses such as a gaming machine such as a pachinko machine or a slot machine, a game apparatus, a liquid crystal display, and a PC with a liquid crystal display are applicable. Also, the display apparatus 100 can implement its function by a plurality of separated apparatuses (for example, the PC and the liquid crystal display).

The entire disclosure of Japanese Patent Application No. 2006-069522, filed March 14, is expressly incorporated by reference herein.

What is claimed is:

1. An image processing system for stereoscopic view using a parallax barrier method, comprising:
   an image generator; and
   an image combiner connected to the image generator via a signal transmission channel, wherein
   the image generator includes:
   an image information generating unit which generates image information configured of a number of pixels of a lower resolution than an actual resolution for each of a first to an nth (n is an integer of 2 or greater) viewpoint; and
   a generated signal transmitting unit which transmits a generated image signal based on the image information to the signal transmission channel, and
   the image combiner includes:
   a receiving unit which receives the generated image signal via the signal transmission channel, based on the relevant generated image signal, and reconfigures the image information;
   a screen buffer which is divided into unique areas corresponding to the first to nth viewpoint, and stores the reconfigured image information corresponding to each viewpoint;
   a transfer unit which transfers the image information to each unique area of the screen buffer; and
   a combining/transmitting unit which generates an image signal for displaying images separated into the individual viewpoints by parallax barriers as one stereoscopic image by combining the image information transferred to each unique area of the screen buffer, and transmits the image signal to a liquid crystal panel,
   a transmission speed of the generated signal transmitting unit being set to be at least n times faster than a transmission speed of the combining/transmitting unit.

2. The image processing system according to claim 1, wherein
   the image information generating unit appends, to the image information subjected to a rendering, viewpoint information indicating which viewpoint the relevant image information is for, and
   the transfer unit, if the viewpoint information is appended, transfers image information not including the viewpoint information to a unique area corresponding to a viewpoint indicated by the relevant viewpoint information.

3. The image processing system according to claim 1, wherein
   the number of pixels of the lower resolution is derived by dividing a total number of pixels configuring a whole of the display image by a number of viewpoints n, in the case that the display image using parallax barrier method is observed as a stereoscopic image in which different images are at least simultaneously observed with left and right eyes.

4. The image processing system according to claim 1, wherein
   the combining/transmitting unit, based on a mask pattern correlated with each viewpoint, by referring to each unique area of the screen buffer, combines sub-pixel components as a stereoscopic image is observed, and transmits the image signal to the liquid crystal panel.

5. A display apparatus including the image processing system according to claim 4, comprising:
   the liquid crystal panel provided with parallax barriers in units of sub-pixels, wherein
   the mask patterns are set based on a position of the parallax barriers.

6. An image processing method of a display apparatus comprising:
   a liquid crystal panel for stereoscopic view using the parallax barrier method; an image generator; and an image combiner connected to the image generator via a signal transmission channel, wherein the image generator:

generates image information configured of a number of pixels of a lower resolution than an actual resolution for each of a first to an nth (n is an integer of 2 or greater) viewpoints; and transmits a generated image signal based on the image information to the signal transmission channel, and the image combiner:

receives the generated image signal via the signal transmission channel, based on the relevant generated image signal;

reconfigures the image information;

transfers the reconfigured image information to each unique area of a screen buffer which is divided into unique areas corresponding to the first to nth viewpoints;

generates an image signal for displaying images separated into the individual viewpoints by parallax barriers as one stereoscopic image by combining the image information transferred to each unique area of the screen buffer; and transmits the image signal to a liquid crystal panel, a speed of the transmission of the generated image signal by the image generator being set to be at least n times faster than a speed of the transmission of the image signal by the image combiner.

7. An image processing system for stereoscopic view using a parallax barrier method, comprising:

an image generator; and an image combiner connected to the image generator via a signal transmission channel, wherein the image generator includes:

an image information generating unit which generates image information configured of a number of pixels of a lower resolution than an actual resolution for each of a first to an nth (n is an integer of 2 or greater) viewpoint; and a generated signal transmitting unit which transmits a generated image signal based on the image information to the signal transmission channel, and the image combiner includes:

a receiving unit which receives the generated image signal via the signal transmission channel, based on the relevant generated image signal, and reconfigures the image information;

a screen buffer which is divided into unique areas corresponding to the first to nth viewpoint, and stores the reconfigured image information corresponding to each viewpoint;

a transfer unit which transfers the image information to each unique area of the screen buffer; and a combining/transmitting unit which generates an image signal for displaying images separated into the individual viewpoints by parallax barriers as one stereoscopic image by combining the image information transferred to each unique area of the screen buffer, and transmits the image signal to a liquid crystal panel, wherein:

a transmission speed of the generated signal transmitting unit being set to be at least n times faster than a transmission speed of the combining/transmitting unit, the image information generating unit appends, to the image information subjected to a rendering, viewpoint information indicating which viewpoint the relevant image information is for, the transfer unit, if the viewpoint information is appended, transfers image information not including the viewpoint information to a unique area corresponding to a viewpoint indicated by the relevant viewpoint information, the image information generating unit, if there is no need to update generated image information generated immediately before, appends invalidity information indicating that it is invalid to the generated image information generated immediately before, without further rendering, and the transfer unit does not transfer the image information if the invalidity information is appended.

8. The image processing system according to claim 7, wherein the number of pixels of the lower resolution is derived by dividing a total number of pixels configuring a whole of the display image by a number of viewpoints n, in the case that the display image using parallax barrier method is observed as a stereoscopic image in which different images are at least simultaneously observed with left and right eyes.

9. The image processing system according to claim 7, wherein the combining/transmitting unit, based on a mask pattern correlated with each viewpoint, by referring to each unique area of the screen buffer, combines sub-pixel components as a stereoscopic image is observed, and transmits the image signal to the liquid crystal panel.

10. A display apparatus including the image processing system according to claim 9, comprising:

the liquid crystal panel provided with parallax barriers in units of sub-pixels, wherein the mask patterns are set based on a position of the parallax barriers.

* * * * *